(12) United States Patent
Chan et al.

(10) Patent No.: US 9,230,356 B2
(45) Date of Patent: Jan. 5, 2016

(54) DOCUMENT COLLABORATION EFFECTS

(75) Inventors: Wang Chiu Chan, Hong Kong (HK);
Charles J. Migos, San Bruno, CA (US);
Keng Fai Lee, Cupertino, CA (US); M. Frank Emanuel, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 13/332,315

(22) Filed: Dec. 20, 2011

(65) Prior Publication Data

US 2013/0155071 A1    Jun. 20, 2013

(51) Int. Cl.
*G06T 13/00* (2011.01)
*G06T 19/00* (2011.01)

(52) U.S. Cl.
CPC ............... *G06T 13/00* (2013.01); *G06T 19/00* (2013.01); *G06T 2219/024* (2013.01)

(58) Field of Classification Search
CPC ......... G06T 13/00; G06F 17/30; G06F 15/16; G06F 17/24
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,434,002 B1* | 4/2013 | Shah et al. | 715/255 |
| 8,479,122 B2 | 7/2013 | Hotelling et al. | |
| 2006/0026521 A1 | 2/2006 | Hotelling et al. | |
| 2006/0197753 A1 | 9/2006 | Hotelling | |
| 2006/0197764 A1* | 9/2006 | Yang | 345/473 |
| 2011/0055702 A1* | 3/2011 | Jakobson | 715/723 |
| 2012/0233543 A1* | 9/2012 | Vagell et al. | 715/255 |

(Continued)

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Ming Hon
*Assistant Examiner* — Khoa Vu
(74) *Attorney, Agent, or Firm* — Morrison & Foerster LLP

(57) ABSTRACT

Various features and processes related to document collaboration are disclosed. In some implementations, animations are presented when updating a local document display to reflect changes made to the document at a remote device. In some implementations, a user can selectively highlight changes made by collaborators in a document. In some implementations, a user can select an identifier associated with another user to display a portion of a document that includes the other user's cursor location. In some implementations, text in document chat sessions can be automatically converted into hyperlinks which, when selected, cause a document editor to perform an operation.

36 Claims, 13 Drawing Sheets

(56) References Cited

U.S. PATENT DOCUMENTS

| | | | |
|---|---|---|---|
| 2013/0120401 A1* | 5/2013 | Borysenko et al. | 345/473 |
| 2013/0124952 A1* | 5/2013 | Frem et al. | 715/202 |
| 2013/0127734 A1* | 5/2013 | Dowd et al. | 345/173 |
| 2013/0218845 A1* | 8/2013 | Kleppner et al. | 707/687 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DOCUMENT COLLABORATION EFFECTS

TECHNICAL FIELD

The disclosure generally relates to document editing and collaboration.

BACKGROUND

Multi-user collaboration on documents is often necessary in industry, academics and other endeavors. For example, software developers may need to collaborate while writing a software architecture document. Students may need to collaborate on a presentation or academic paper. Collaboration on a document is often accomplished by editing the document sequentially (e.g., one collaborator can edit the document at a time). Alternatively, collaboration on a document can be accomplished by having each collaborator edit a different version of the document and then merging the documents together. These methods of collaborating on a document can often be cumbersome, time consuming and inefficient.

SUMMARY

Various features and processes related to document collaboration are disclosed. In some implementations, animations are presented when updating a local document display to reflect changes made to the document at a remote device. In some implementations, a user can selectively highlight changes made by collaborators in a document. In some implementations, a user can select an identifier associated with another user to display a portion of a document that includes the other user's cursor location. In some implementations, text in document chat sessions can be automatically converted into hyperlinks which, when selected, cause a document editor to perform an operation.

Particular implementations provide at least the following advantages: Animating changes to a document can quickly draw a user's attention to the changes and provide a more entertaining collaboration experience. Selectively highlighting document changes can allow a user to quickly find important changes to the document. Jumping to another user's cursor location allows users' to quickly view the changes that other users are currently making to a document. Document chat links allow collaborating users to communicate and help each other in a more efficient manner.

Details of one or more implementations are set forth in the accompanying drawings and the description below. Other features, aspects, and potential advantages will be apparent from the description and drawings, and from the claims.

DESCRIPTION OF DRAWINGS

FIG. 3 illustrates an example graphical interface for presenting text changes made to a document.

FIG. 4 illustrates an example graphical interface for selective change highlighting.

FIG. 5 illustrates an example graphical interface for accepting or rejecting changes to a document.

FIG. 6 illustrates an example graphical interface for jumping to a collaborator's cursor location.

FIG. 7 illustrates an example graphical interface for presenting smart text in a document chat session.

Like reference symbols in the various drawings indicate like elements.

DETAILED DESCRIPTION

Document Collaboration

Figure 1:
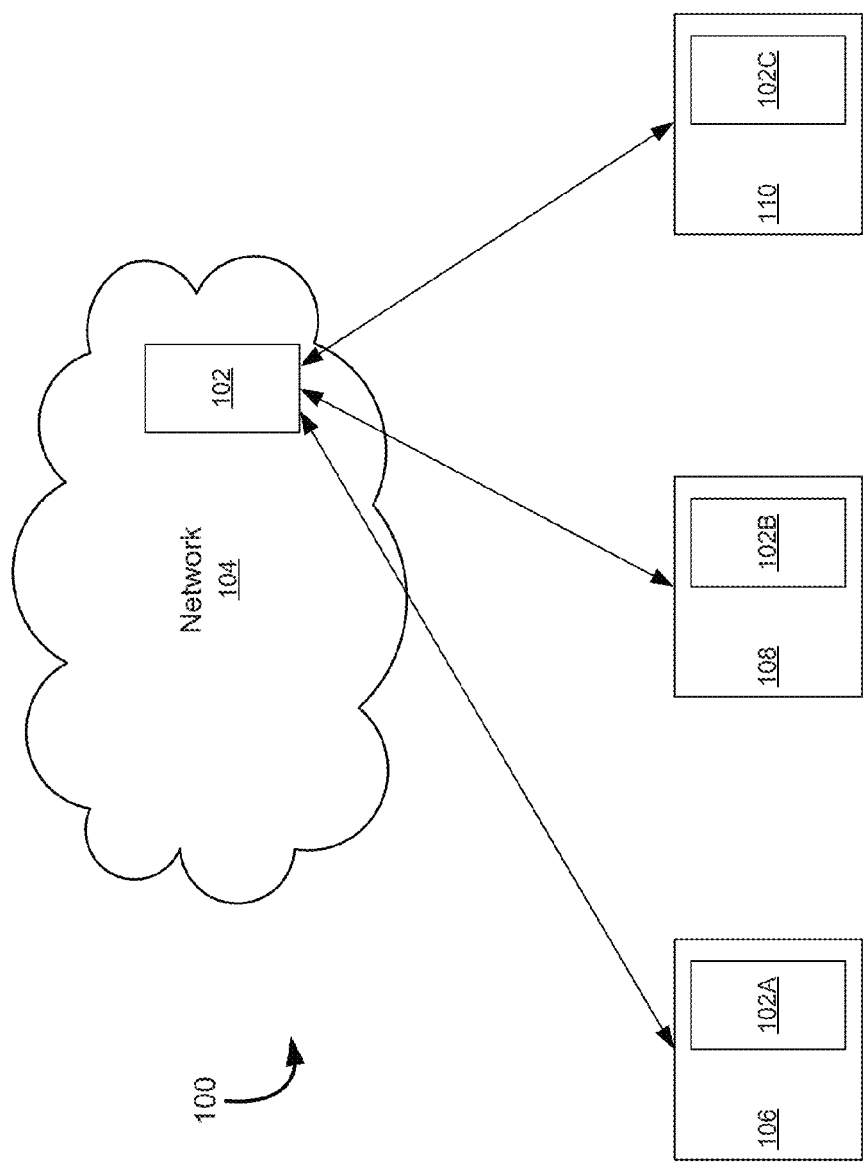
FIG. 1 illustrates an example system for concurrent document collaboration.

FIG. 1 illustrates an example system 100 for concurrent document collaboration. In some implementations, two or more users can collaborate on a document simultaneously. For example, document 102 can be a word processing document, a spreadsheet document, a multi-media document, or any other document that can be edited. In some implementations, document 102 can be stored on a computing device within network 104. Network 104 can be a network that includes wired or wirelessly connected computing devices. For example, network 104 can include the Internet (e.g., World Wide Web), an intranet, or a home network. In some implementations, network 104 can be coupled to or include computing devices 106, 108 and/or 110. For example, computing devices 106, 108 and 110 can include any computing device, such as a laptop computer, desktop computer, tablet computer, smartphone, etc.

In some implementations, users of computing devices 106, 108 and 110 can collaborate on editing document 102. In some implementations, computing devices 106, 108 and 110 can provide access to document 102 such that users can make changes or edit document 102 concurrently. For example, computing devices 106, 108 and 110 can provide a view 102A, 102B, 102C of document 102. Document views 102A, 102B and 102C can be a local copy of document 102 that is automatically synchronized with document 102 in network 104. Document views 102A, 102B and 102C can be representations of the actual document 102 such that changes made within the document views are made near real-time to document 102. In some implementations, changes made to documents view 102A on computing device 106 can be synchronized with document 102 on network 104 and viewed within document views 102B and 102C on computing devices 108 and 110 as the changes are being made within document view 102A. For example, as a character, word, object or other content is added to document 102 through document view 102A, the added content can be synchronized to and viewed within document views 102B and 102C. Thus, the changes within document view 102A can be synchronized with document 102 and seen within document views 102B and 102C in approximately real-time.

Collaboration Effects

Figure 2:
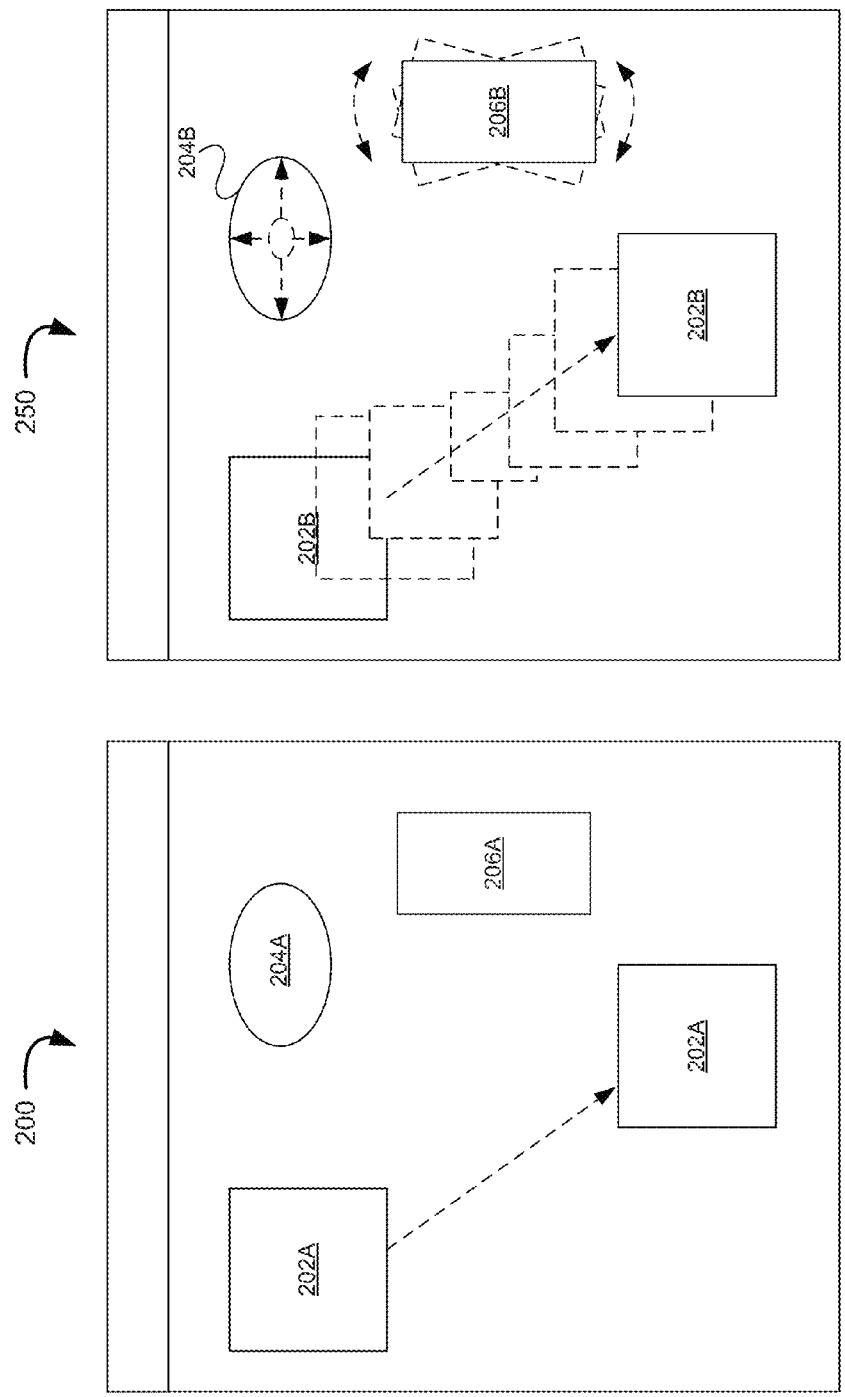
FIG. 2 illustrates an example graphical user interface for presenting collaboration effects.

FIG. 2 illustrates an example graphical interface 250 for presenting collaboration effects. In some implementations, graphical interfaces 200 and 250 can correspond to an interface for viewing or editing document view 102A, 102B or 102C. In some implementations, an animation can be used for presenting changes made to a document. For example, when a user makes changes to a document within document view 102A on computing device 106, the changes can be presented to a user of computing device 108 within document view 102B along with an animation associated with the change.

In some implementations, when an object within a document is moved on a first device, the move can be animated on a second device. For example, interface 200 can display document view 102A on computing device 106. Document view 102A can display an object 202A corresponding to an object within document 102. A user of computing device 106 can move object 202A to a new location within document view 102A. The new location of object 202A can be synchronized with document 102 and displayed in document view 102C (interface 250) of computing device 110. For example, the location of corresponding object 202B in document view 102C can change. In some implementations, the change of location of object 202B in document view 102C can be animated. For example, object 202B in document view 102C can be animated to move from the object's original location to the object's new location as specified by the user of computing device 106. In some implementations, the move animation can include resizing object 202B. For example, object 202B can be scaled up or scaled down in size during the move animation, as illustrated by FIG. 2.

In some implementations, when an object is added to, removed from, or resized on a document on a first device, the addition, removal or resizing of the object can be animated on a second device. For example, object 204A can be added to document view 102A (interface 200). The addition of object 204A within document view 102A can be synchronized to document 102 and can be displayed within document views 102B and 102C. For example, corresponding object 204B in can be added to document view 102C (interface 250). In some implementations, the addition of object 204B to document view 102C can be animated. For example, object 204B can be animated to expand out (e.g., grow) from a single point until object 204B is the size of the added object 204A. In some implementations, object 204B can be animated to bounce into view on document view 102C. In some implementations, a deletion of an object can be presented with an animation. For example, if object 204A is deleted within document view 102A, object 204B can be shrunk (e.g., scaled down) to a single point and removed from document view 102C. Similarly, if object 204A is resized, object 204B can be animated to shrink or grow correspondingly.

In some implementations, if a user changes an attribute of an object on a first device, the change can be presented along with an animation on a second device. For example, if a user changes the color of object 206A (e.g., from orange to blue), object 206B can be modified to reflect the color change (e.g., object 206B will turn blue). In some implementations, an animation will be presented while changing colors. For example, a transition animation (e.g., a shaking, rotation, oscillation animation) can be presented when object 206B is changed from orange to blue.

In some implementations, other document change animations can be presented. For example, when a user on a first device edits a worksheet cell of a spreadsheet application, a highlight animation can be displayed on a second device as the changes to the worksheet cell are displayed on the second device. For example, the worksheet cell displayed on the second device can temporarily fill with color (e.g., yellow) when the worksheet cell is edited on the first device to draw the user's attention to the edited cell.

The document change animations described above can serve not only to present an interesting collaborative environment for document editing but can also serve to draw a user's attention to edits that are currently being made to the document by other users (collaborators).

Tracking Changes in Real-Time

Figure 3:
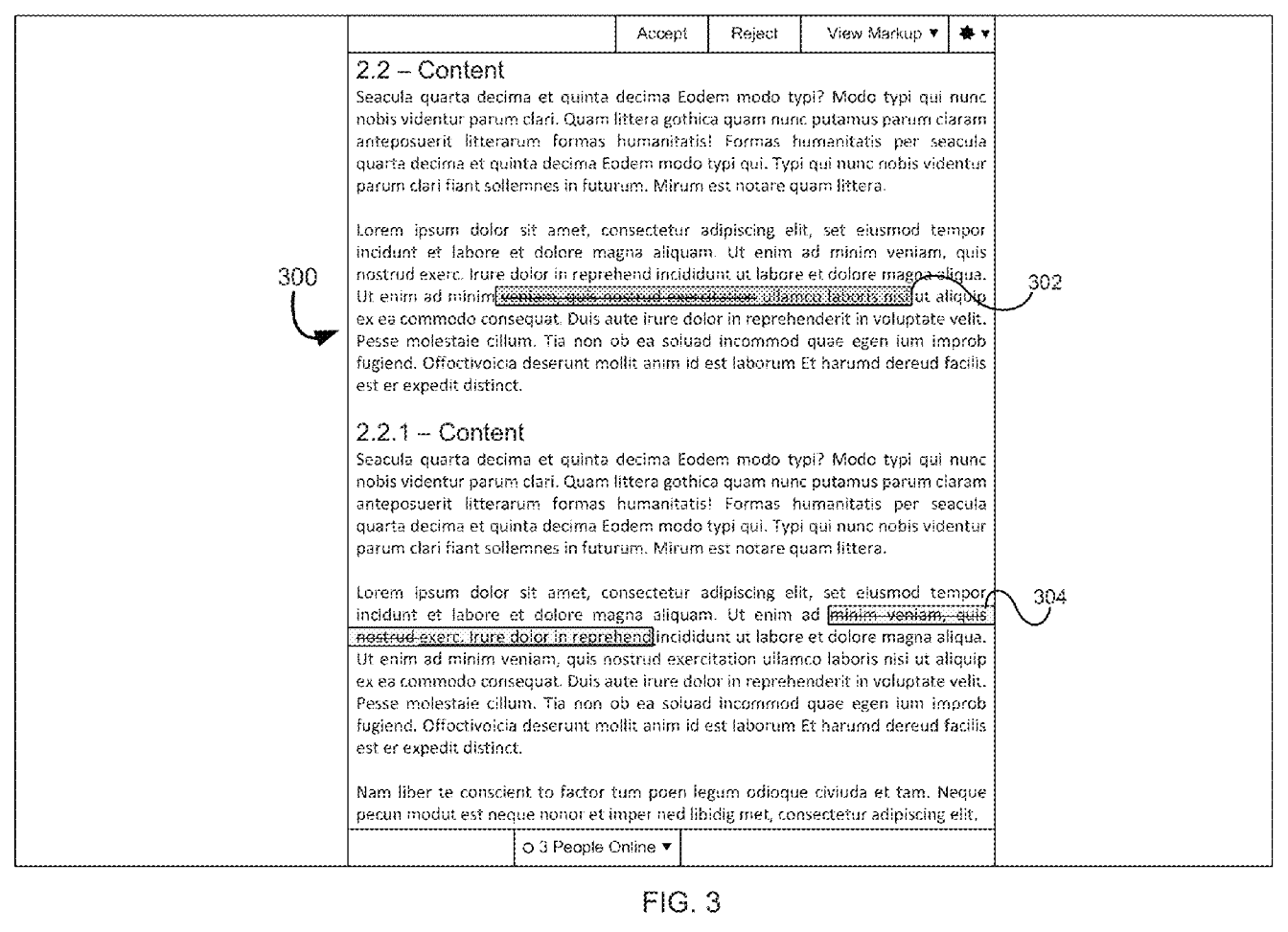

FIG. 3 illustrates an example graphical interface 300 for presenting text changes made to a document. In some implementations, graphical interface 300 can correspond to an interface for viewing or editing document view 102A, 102B or 102C. For example, changes made to document 102 by a user of computing device 106 through document view 102A can be viewed by a user of computing device 108 in document view 102B. In some implementations, the changes made to document 102 can be tracked, associated with a user who made the changes and highlighted so that other users (collaborators) can view the changes.

In some implementations, changes to document 102 (e.g., through document views 102A, 102B and/or 102C) can be tracked. For example, a document editor software application can have a track changes feature. In some implementations, if the track changes feature is turned on, changes made to the document will be provisional pending acceptance of the changes into the document. In some implementations, provisional changes can be marked up or annotated. For example, text added to a document can be underlined. Text deleted from a document can be presented with a line through the text (e.g., strikethrough formatted), for example.

In some implementations, the provisional changes can be associated with metadata that identifies who (e.g., which user) made the changes. For example, if a user named Bob made changes 302, then the metadata associated with change 302 will include information that identifies Bob as the user who made change 302. If a user named Fred made changes 304, then the metadata associated with change 304 will include information that identifies Fred as the user who made change 304.

In some implementations, the provisional changes can be highlighted. For example, the provisional changes can be color highlighted according to who made the provisional changes. Bob, for example, can be associated with the color yellow and provisional changes made by Bob can be highlighted in yellow (e.g., have a yellow background). Likewise, Fred can be associated with the color green and provisional changes made by Fred can be highlighted in green, for example.

In some implementations, the provisional changes, including formatting, markup, annotating and/or highlighting, can be seen by collaborators (users) as the provisional changes are made. For example, while a user of computing device 106 is making provisional changes to document 102 through document view 102A, users of computing devices 108 and 110 can view the provisional changes through respective document views 102B and 102C. As each character, word, sentence or object is added, deleted or modified in document view 102A, the provisional changes can be displayed in document views 102B and 102C along with the appropriate markup, formatting, annotations and/or highlighting, as described above.

Selective Change Highlighting

Figure 4:
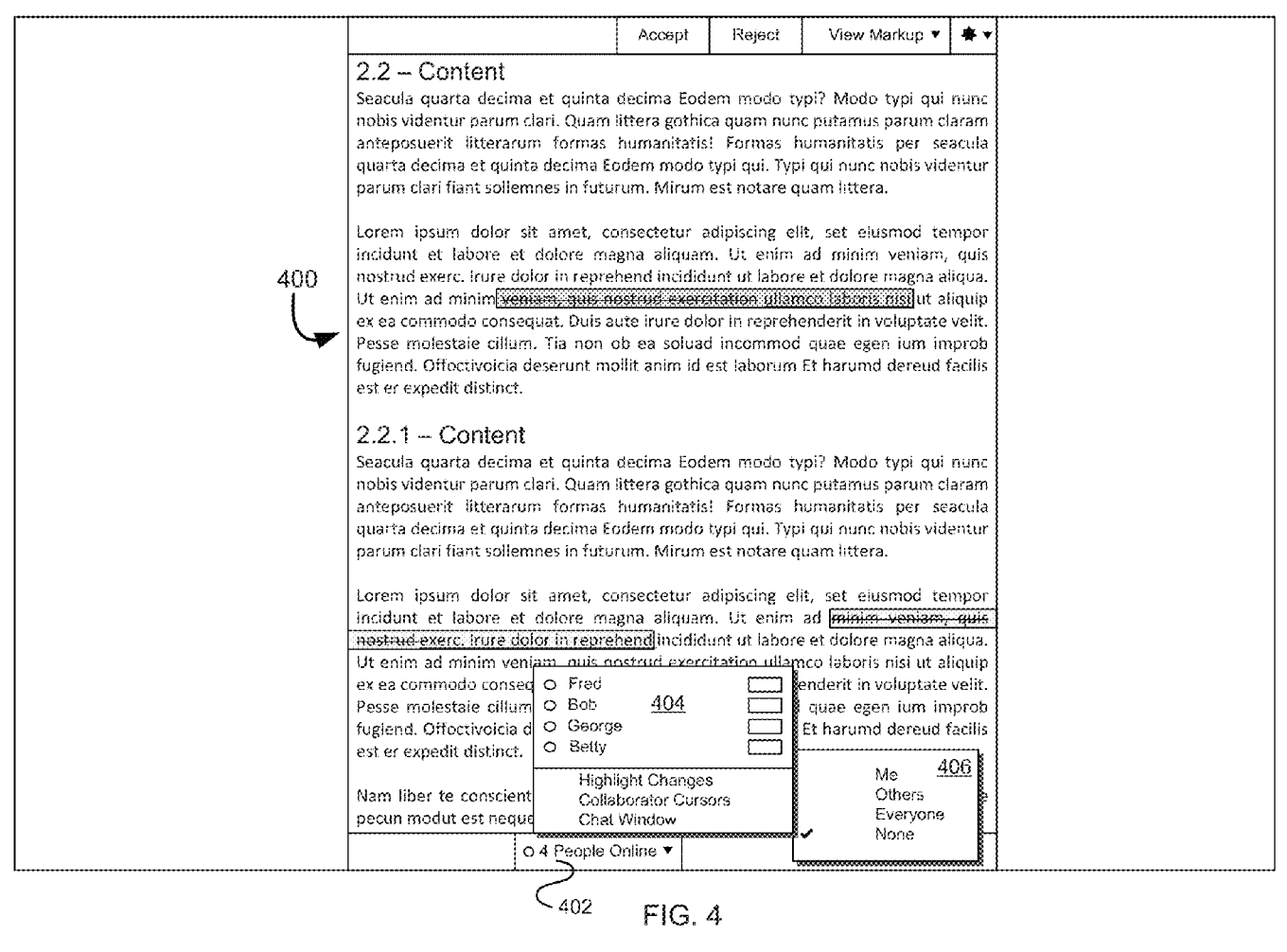

FIG. 4 illustrates an example graphical interface 400 for selective change highlighting. In some implementations, graphical interface 400 can correspond to an interface for viewing or editing document view 102A, 102B or 102C. In some implementations, a user can select which provisional changes will be highlighted. For example, graphical interface 400 can include graphical element 402. Graphical element 402 can present information about the number of collaborators (e.g., users, editors) that are currently accessing the document. For example, if four users are currently viewing, editing or otherwise accessing the document (e.g., document 102), graphical element 402 will display information that indicates that four users are accessing the document.

In some implementations, graphical element 402 is selectable. For example, a user can select graphical element 402 to cause graphical element 404 to display. For example, graphical element 404 can be a popup menu, a pull-down menu, or a dialog window. In some implementations, graphical element 404 can display information about the users who are currently accessing the document and/or users who have accessed the document in the past. For example, graphical element 404 can present a list (e.g., a collaborator list) of the names of the users, each user's online status and/or the highlighting color associated with each user. In some implementations, graphical element 404 can provide access to additional features of graphical interface 400. For example, a user can select the "Highlight Changes" feature of graphical interface 400 to display graphical element 406.

In some implementations, graphical element 406 can present selectable change highlighting options. For example, a user can select an option to have graphical interface 400 highlight only the changes made by the user so that the user can quickly find the user's own provisional changes in the document. A user can select an option to highlight only the changes made by others. For example, the user may be interested in quickly finding and viewing the provisional changes made by other collaborators. A user can select an option to remove all change highlighting from the document. A user can select an option to highlight all changes in the document. For example, a user can deselect a currently selected option such that none of the change highlighting options are selected to cause all provisional changes to be highlighted in the document.

In some implementations, selective change highlighting can be performed on non-provisional changes as well as provisional changes. For example, portions of text within a document can be associated with the user who added the text to the document regardless of whether the added text is provisional or non-provisional. A user can select one of the change highlighting options presented on graphical element 406 to have the text associated with the selected highlighting option (e.g., text associated with the user, text associated with other users, all text highlighted by user, or no text highlighting) highlighted. For example, if the user selects the option for highlighting all text, then all of the text within the document will be highlighted according to the colors associated with the users who added the respective portions text.

Track Changes Permissions

Figure 5:
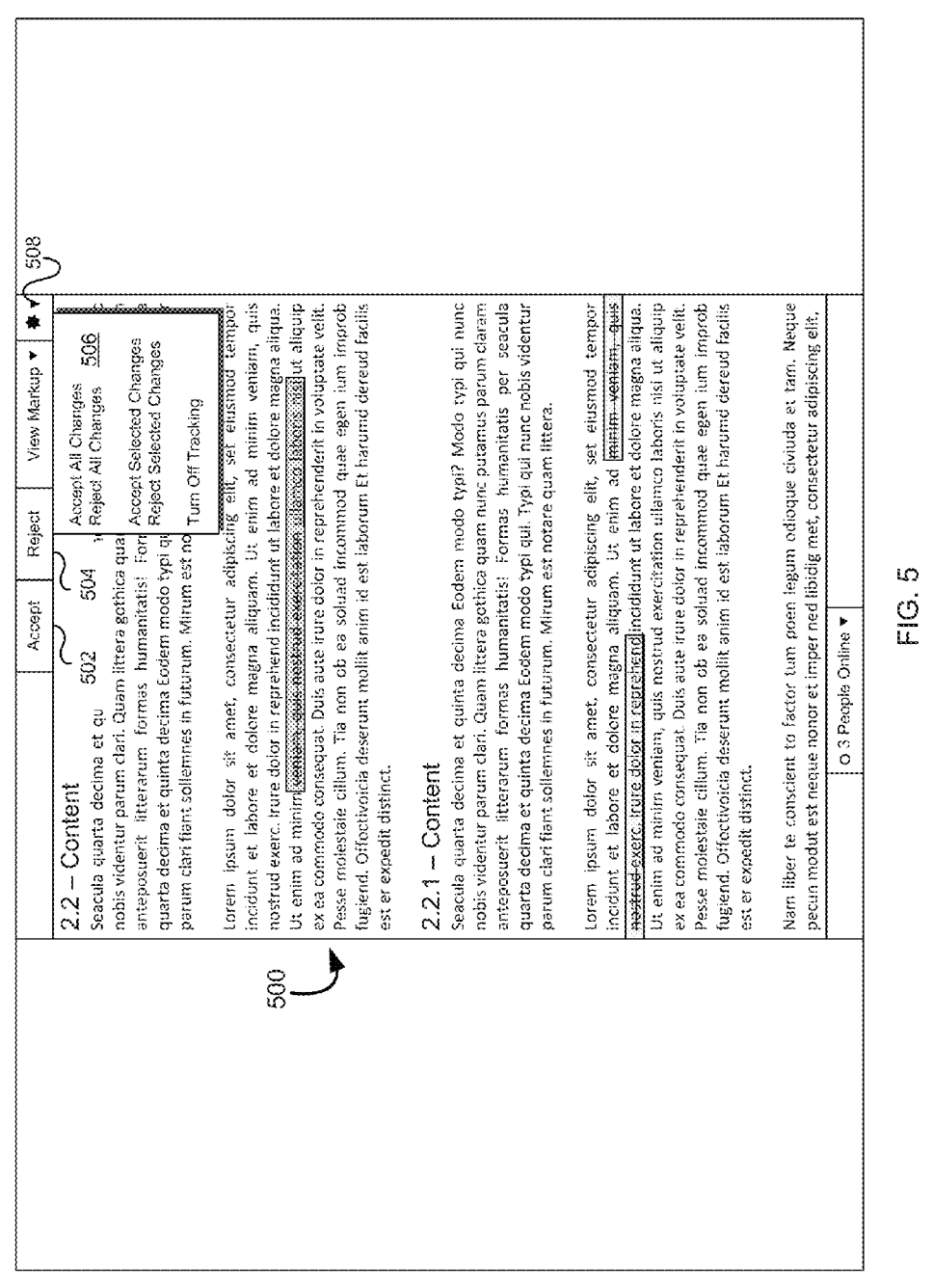

FIG. 5 illustrates an example graphical interface 500 for accepting or rejecting changes to a document. In some implementations, provisional changes to a document can be accepted into or rejected from the document. For example, when provisional changes are accepted into the document the provisional changes become non-provisional changes (e.g., permanent changes subject to later edits) to the document. In some implementations, provisional changes can be accepted into the document by selecting a provisional change (e.g., placing the cursor over or highlighting the text associated with the provisional change) and selecting graphical element 502 (e.g., accept button). Provisional changes can be rejected from the document by selecting a provisional change and selecting graphical element 504 (e.g., reject button). In some implementations, provisional changes can be accepted or rejected through graphical element 506. For example, graphical element 506 can be displayed in response to a user selecting graphical element 508.

In some implementations, graphical element 506 can display change tracking options. For example, graphical element 506 can display selectable options to accept all changes, reject all changes, accept selected changes (similar to graphical element 502), reject selected changes (similar to graphical element 504) and an option to turn off change tracking. A user can select any of the options to cause the corresponding action to be performed. For example, if a user selects the 'accept all changes' option, all of the provisional changes to the document will be accepted into the document as non-provisional changes to the document. Likewise, if the user selects the 'reject all changes' option, all of the provisional changes will be rejected (e.g., removed) from the document.

In some implementations, only an authorized user of the document can accept provisional changes into the document. In some implementations, the document can be associated with track changes permissions. The track changes permissions can be document metadata that identifies which users can perform track changes operations. For example, the track changes permissions can identify which users can turn track changes on and off and which users can accept or reject changes to the document. When the track changes feature is turned on, any user can make provisional changes to the document. However, only an authorized user can accept and reject provisional changes or turn on or off the track changes feature. In some implementations, a user can be authorized to perform specific track changes operations. For example, permissions can be defined that allow a user to turn on the track changes feature but prevent the same user from turning off the track changes feature.

In some implementations, an authorized user can perform track changes operations (e.g., accepting changes, rejecting changes, turning on or off track changes) as other users are editing the document. For example, the authorized user can view provisional changes as the changes are being made to the document by users and accept the provisional changes when they appear.

In some implementations, only the owner of a document will be authorized (e.g., will have permissions) to perform track changes operations. For example, the document owner can be a project supervisor who has assigned various editing tasks to other users. The other users can edit the document as they perform their tasks, the edits can be synchronized in near real-time to the document and the other users, the edits can be tracked if track changes is turned on, and the tracked changes can be presented as provisional changes to the document along with the appropriate markups, highlighting, formatting and annotations, as described above. The document owner can accept and reject provisional changes to the document and turn on or off the track changes feature.

In some implementations, an unauthorized user (e.g., non-owner user) will be unable to accept or reject changes to a document or turn on or off the track changes feature. For example, graphical interface 500 can prevent the non-owner user from selecting graphical elements 502 and 504 and prevent the non-owner user from displaying graphical element 506 or selecting any of the options on graphical element 506. Graphical elements 502, 504, 506 and/or 508 can be disabled (e.g., not selectable) on graphical interface 500, for example.

Jump to Collaborator's Cursor

Figure 6:
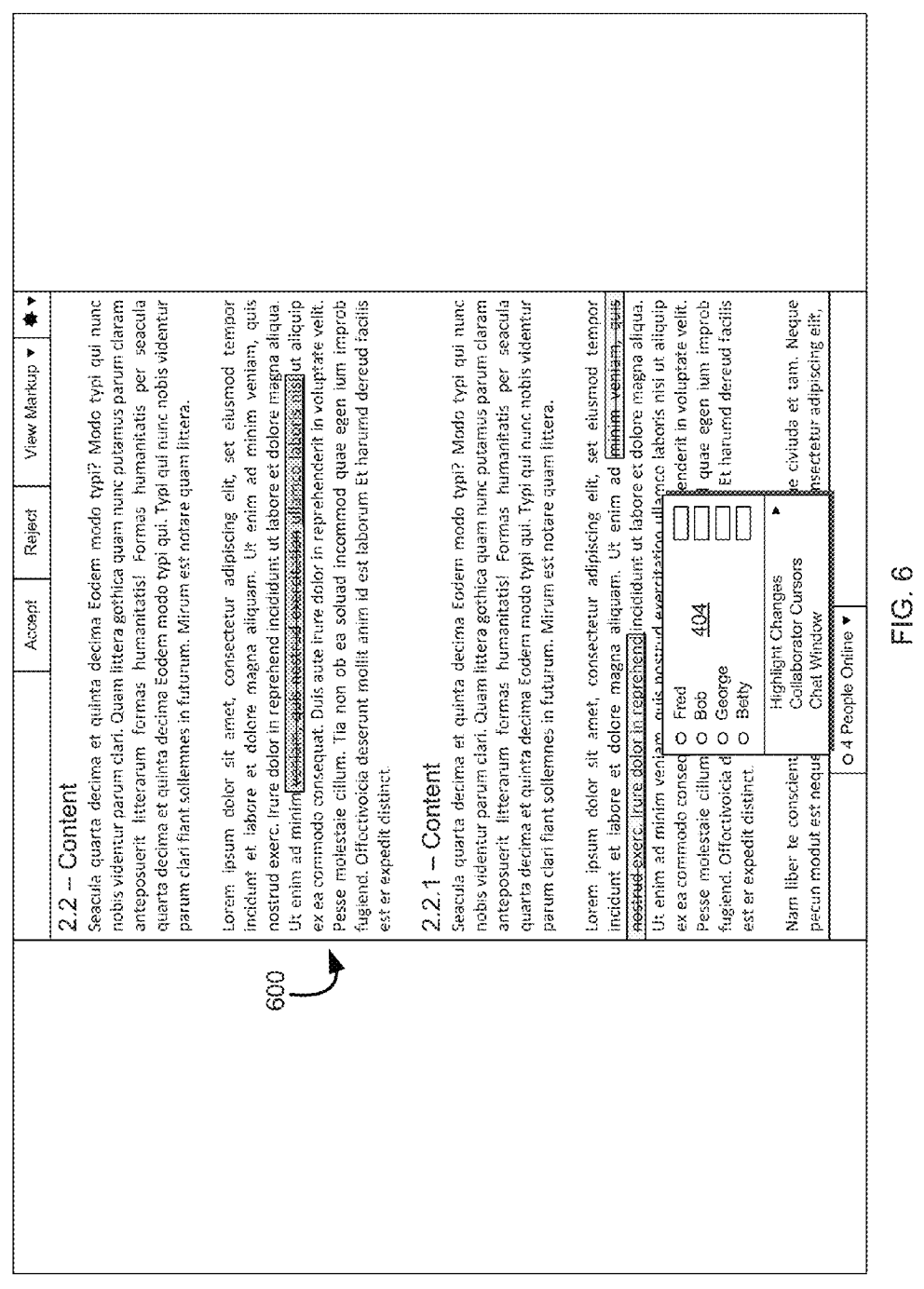

FIG. 6 illustrates an example graphical interface 600 for jumping to a collaborator's cursor location. In some implementations, a user can cause another user's cursor location to be displayed on graphical interface 600. For example, a user can select another user's name (e.g., George) displayed on graphical element 404. In response to the selection, the portion of the document that includes the selected user's (e.g., George's) current cursor location will be displayed. Thus, a user can quickly go to and view the location in the document where the other user is making edits.

Smart Text in Document Chat

Figure 7:
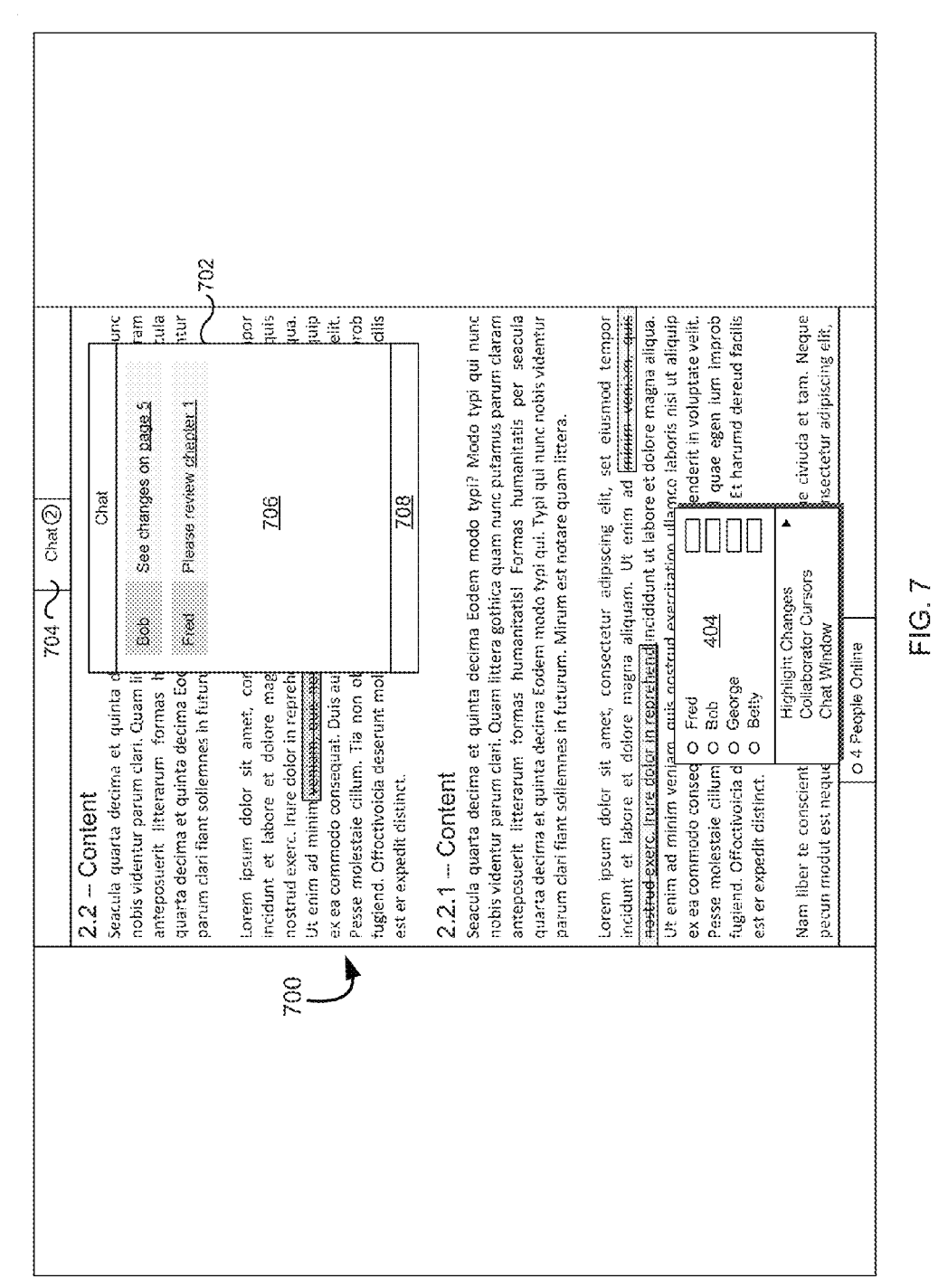

FIG. 7 illustrates an example graphical interface 700 for presenting smart text in a document chat session. In some implementations, a document editor can include a chat feature. For example, collaborators (users) who are working on a document can send messages to each other through a chat feature of the document editor. In some implementations, a user can open chat window 702 by selecting graphical element 704 (e.g., chat button) or the 'chat window' option of graphical element 404. For example, a user can select a user from the list of users displayed on graphical element 404 and then select the 'chat window' option to initiate a chat session with the selected user. If a user has received a chat message, graphical element 704 can display an indication of the number of chat messages received. The user can select graphical element 704 to view the received chat messages. In some implementations, chat window 702 can display automatically when a new chat message is received.

In some implementations, chat window area 706 can display received chat messages. In some implementations, chat window area 708 can be an input area for composing messages to send to other users. For example, a user can use a keyboard (e.g., virtual or physical) to type text into area 708 and press the 'enter' or 'return' key on the keyboard to cause the text message to be sent to another user.

In some implementations, chat messages can include text that relates to functions of the document editor and/or attributes of the document. For example, text received in a chat message can refer to a page number, paragraph, a chapter, or a section of a document. The text can refer to a figure, graph or other media item embedded in the document. The chat message text can refer to an operation, menu item or feature of the document editor. For example, a user can assist another user by identifying a particular editing menu in a chat session.

In some implementations, text references to document attributes and/or document editor features can be converted into selectable links (e.g., hyperlinks) that, when selected, cause some document editor function to be performed. For example, a textual page reference (e.g., 'page 5') can be converted into a link, which when selected, causes the document editor to display page five (5) of the document. The link causes a 'go to page' function to be performed by the document editor. A textual reference to a 'drawing tool' of the document editor can be converted to a link which, when selected, can cause a corresponding drawing tool to be displayed in the document editor. In some implementations, the link can be displayed with special formatting (e.g., underlining) or highlighting to let the user know that the text of the link is selectable, as illustrated by FIG. 7.

Example Processes

Figure 8:
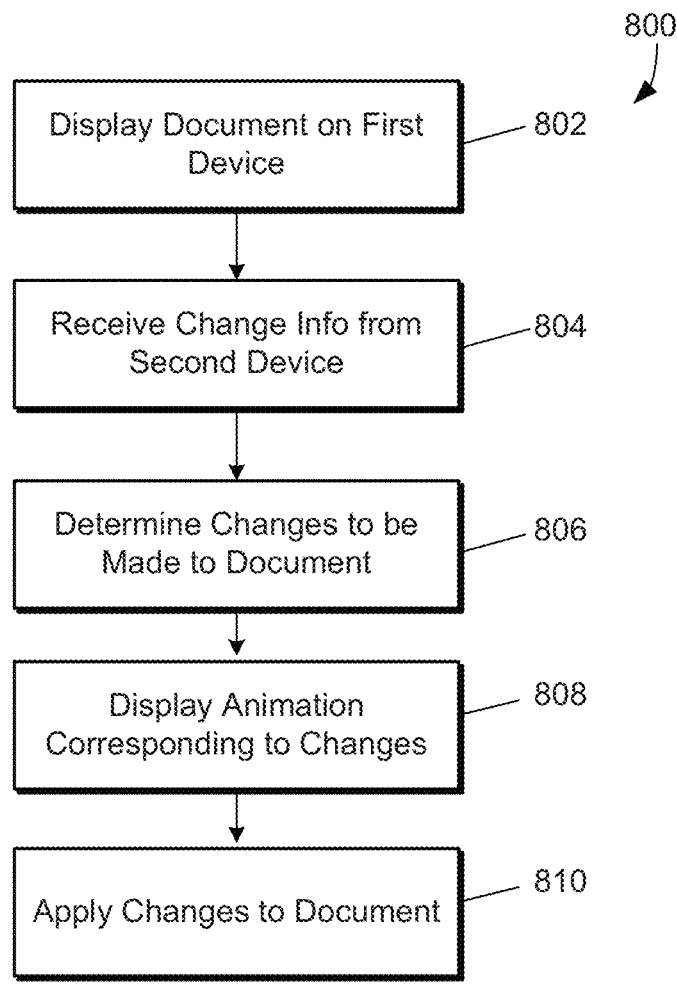
FIG. 8 is a flow diagram of an example process for presenting collaboration effects.

FIG. 8 is a flow diagram of an example process 800 for presenting collaboration effects. In some implementations, when a document change made on a first device is displayed on a second device, an animation associated with the change is displayed.

At step 802, a document is displayed on a first device. For example, a document can be displayed and edited by multiple different users on multiple different devices.

At step 804, change information is received from a second device. For example, a user on one device can make edits (changes) to the document. Information describing the changes can be transmitted to the other devices that are displaying the document. The change information can include information that identifies objects that were changed in the document (e.g., media objects, text, etc.), the type of changes made (e.g., additions, deletions, moves, formatting, etc.) and locations where the changes were made to the document.

At step 806, the changes to be made to the document are determined. For example, once the change information is received, changes to the local document can be determined based on the change information. For example, the object information, the change type information and the location information can be analyzed to determine what changes need to be made to the document. The change information can specify that an image object was added to the document on page ten (10), for example.

At step 808, an animation is displayed according to the type of document change. For example, the local document editor can be configured with animation information. Animation information can specify what kind of animation to display for a particular document change. For example, the animation information can include a mapping of animation type to object type and/or change type. For example, an addition change type can be mapped to a scale up (e.g., enlarge, grow) animation. A move change type can be mapped to a move animation. A change to an image object can be mapped to a shake (e.g., wiggle) animation.

In some implementations, an animation can be determined based on the change information. For example, the object type and/or the change type in the change information can be used to lookup the appropriate animation. Once the animation is determined, the animation can be displayed at the document location specified in the change information. For example, the object to be added, deleted, modified or moved can be animated according to the change information and the animation information.

At step 810, the changes can be applied to the document. For example, after or while the animation is displayed, the changes identified in the change information can be applied to the document. For example, the object can be added, deleted, modified, or moved within the document according to the change information.

Figure 9:
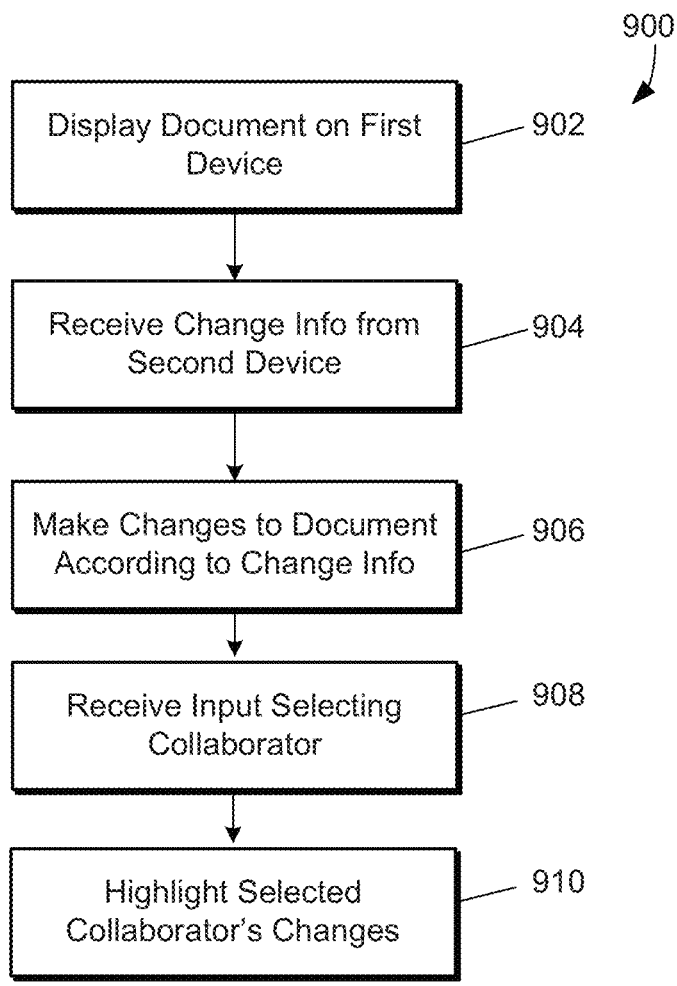
FIG. 9 is a flow diagram of an example process for selective change highlighting.

FIG. 9 is a flow diagram of an example process 900 for selective change highlighting. In some implementations, a user can select which collaborators' changes to highlight.

At step 902, a document is displayed on a first device. For example, multiple users can collaborate on a document from multiple devices.

At step 904, change information is received from a second device. For example, each user can make changes to the document. Each user's changes can be transmitted to the other user's devices. Thus, a user's device can receive change information from one or more other users' devices. For example, the change information can include a description of the type of change, such as an identification and location of text that has been added or deleted from the document and an identification of a user corresponding to each change.

At step 906, changes are made to the document according to the change information. For example, each user's changes can be incorporated into the document displayed on the other users' devices. If track changes is turned on, each users' changes will be displayed as provisional changes (e.g., marked up and/or highlighted) until the provisional changes are accepted into the document.

At step 908, input selecting one or more collaborators is received. For example, a user can select to highlight the user's own changes, other users' changes, all changes or no changes.

At step 910, the selected collaborators' changes are highlighted. Once the user has selected whose changes to highlight, the document display can be modified to highlight the selected users' changes. For example, change highlighting can be performed by changing the background color of text from white to a color, such as green, yellow or red. In some implementations, only the selected users' changes will be highlighted.

Figure 10:
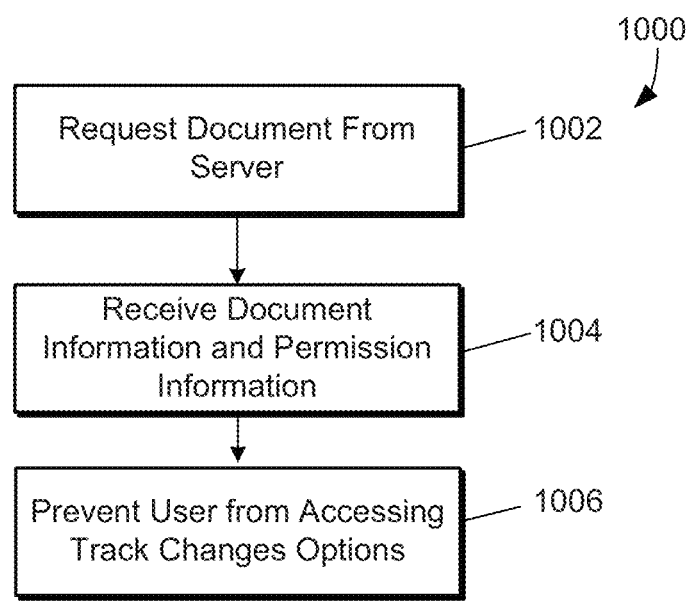
FIG. 10 is flow diagram of an example process for permissions based document change tracking.

FIG. 10 is flow diagram of an example process 1000 for permissions based document change tracking. In some implementations, provisional changes to a document can only be accepted by authorized users. In some implementations, an authorized user is an owner of the document. In some implementations, an authorized user is determined based on permissions associated with the document.

At step 1002, a document is requested from a document server. For example, a user device can request a document from the server. The request can include identification information for the user. The document can be associated with multiple users and multiple devices. The users can collaborate on the document and make changes or edits to the document concurrently, for example.

At step 1004, document information is received from the server along with document permissions information. For example, the document information can include content and formatting information for the document that defines how the document content should be displayed. The document permissions information can indicate whether the requesting user has permission to accept or reject provisional changes to the document. For example, when the server receives the document request, the server can determine whether the requesting user has permissions to accept or reject changes to the document and whether the requesting user can turn on and off the track changes feature. The server can look up the user's permissions based on the user identification information included in the document request.

At step 1006, the user is prevented from accessing the track changes options. For example, if the document permissions information indicates that the requesting user is not authorized to accept or reject provisional changes to the document and/or is not authorized to turn on or off the track changes feature, the user will be prevented from invoking any of these track changes options. For example, the graphical interface elements for accepting and rejecting changes and turning on and off the track changes features can be disabled so that the user cannot select these elements.

Figure 11:
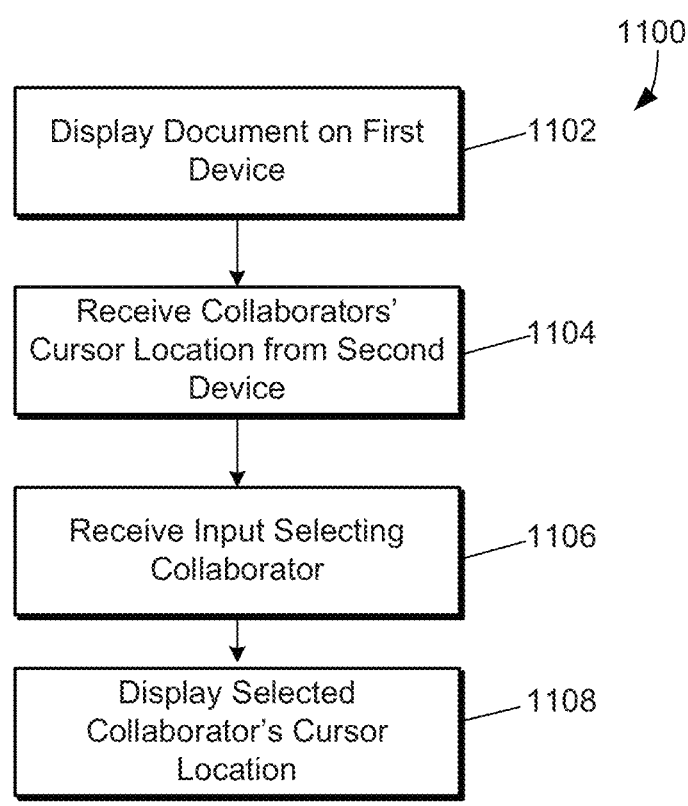
FIG. 11 is a flow diagram of an example process for jumping to a collaborator's cursor location.

FIG. 11 is a flow diagram of an example process for jumping to a collaborator's cursor location. At step 1102, a document can be displayed to a user on a first device. For example, multiple users on multiple devices can collaborate on editing a document.

At step 1104, the first device can receive information describing another user's cursor location in the document. For example, each user's device can communicate information to other devices. For example, a user's device can communicate to other users' devices information describing changes made to the document and current cursor location information. The information can be communicated directly from device to device or can be transmitted to and forwarded from the server that manages (stores) the document.

At step 1106, input selecting the other user can be received. For example, graphical interface 600 can display a list of user's who are currently accessing the document and a user can select one of the users in the list, as described above with reference to FIG. 6.

At step 1108, the selected user's cursor location can be displayed. For example, a portion of the document that includes the location of the selected user's cursor can be displayed. If the user's cursor is located on page six, then page six can be displayed, for example.

Figure 12:
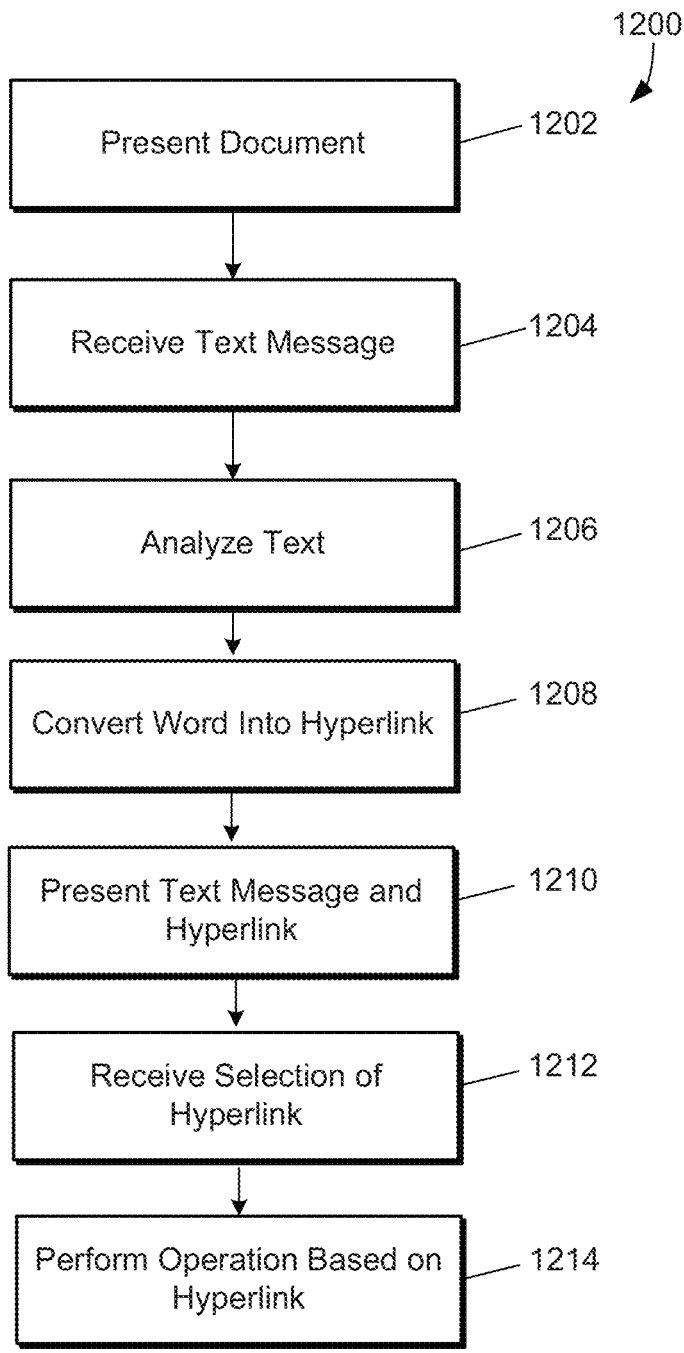
FIG. 12 is a flow diagram of an example process for smart text in document chat.

FIG. 12 is a flow diagram of an example process 1200 for smart text in document chat. At step 1202, a document is presented in a graphical interface of a device. For example, the document can be presented in a user interface of a document editing application.

At step 1204, a text message is received. For example, the document editing application can include a chat feature that allows user to communicate while collaborating on the document and a user can receive a text chat message while viewing the document.

At step 1206, the text of the chat message is analyzed for keywords. For example, the document editing application and/or the chat feature can be configured to recognize keywords related to document attributes and/or document editing application features and functions. Document attribute keywords can include 'page,' 'chapter,' and 'figure,' among others. Document editing application keywords can include 'insert,' 'open,' and 'format,' among others. Each of these keywords can correspond to a document editor function. For example, the keyword 'page' can correspond to a 'go to page' function. The keyword 'insert' can correspond to an insert menu item.

At step 1208, the words matching configured keywords are converted into hyperlinks. For example, when a chat message is received containing the text "See page 5," the word 'page' will recognized as a keyword and the word and the page number '5' will be converted into a hyperlink. The hyperlink will be configured to invoke an operation corresponding to the recognized keyword. For example, the hyperlink can invoke a 'go to page' function, invoke a menu item, or invoke a tool of the document editor.

At step 1210, the text message and the hyperlink will be displayed. For example, the chat message text will be displayed in a chat window. The portion of the chat message text that includes 'page 5' will be displayed as a hyperlink. At step 1212, a selection of the hyperlink is received. For example, a user can select the 'page 5' hyperlink in the chat window.

At step 1214, the document editing application can perform an operation based on the hyperlink. For example, when the 'page 5' hyperlink is selected, the document editing application can display page 5 of the document. Other operations, such as invoking an editing tool or menu item, can be invoked based on the configuration of the hyperlink.

Example Device Architecture

Figure 13:
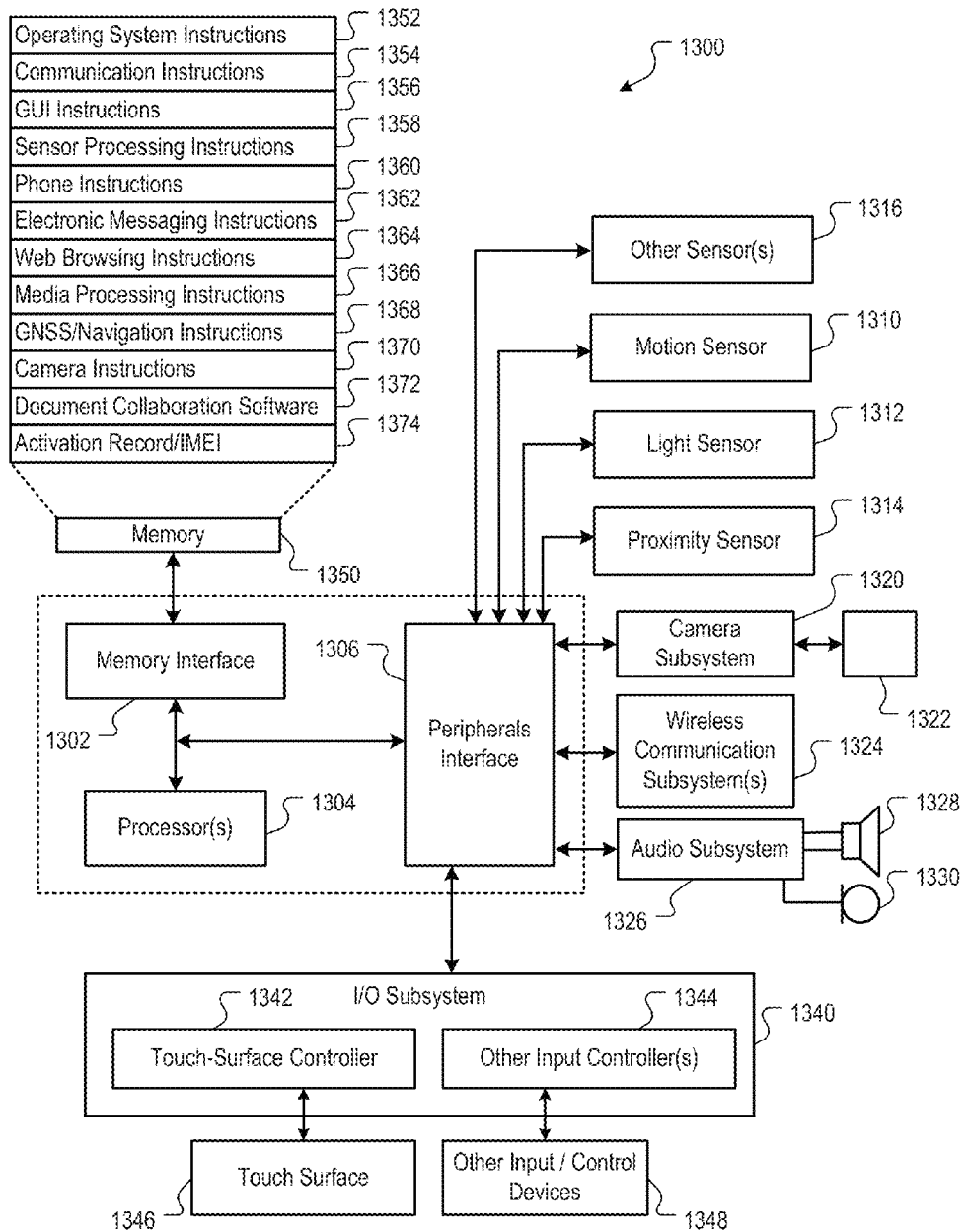
FIG. 13 is a block diagram of an example computing device for implementing the features and processes of FIGS. 1-12.

FIG. 13 is a block diagram 1300 of an example computing device (e.g., computing device 102, 106, 108 and/or 110 of FIG. 1) for implementing the features and processes of FIGS. 1-12. The device can include a memory interface 1302, one or more data processors, image processors and/or central processing units 1304, and a peripherals interface 1306. The memory interface 1302, the one or more processors 1304 and/or the peripherals interface 1306 can be separate components or can be integrated in one or more integrated circuits.

The various components in the device can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which the device is intended to operate. For example, the device can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions.

The I/O subsystem 1340 can include a touch-surface controller 1342 and/or other input controller(s) 1344. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In one implementation, a pressing of the button for a first duration can disengage a lock of the touch surface 1346; and a pressing of the button for a second duration that is longer than the first duration can turn power to the device on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the device can present recorded audio and/or video files, such as MP3, AAC, and MPEG files.

In some implementations, the mobile device 100 can include the functionality of an MP3 player, such as an iPod™. The device can, therefore, include a 36-pin connector that is compatible with the iPod. Other input/output and control devices can also be used.

The memory interface 1302 can be coupled to memory 1350. The memory 1350 can include high-speed random access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the document collaboration features described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store other software instructions 1372 to facilitate other processes and functions, such as the document collaboration processes and functions described with reference to FIGS. 1-12. For example, the software instructions can include instructions for performing voice authentication on a per application or per feature basis and for allowing a user to configure authentication requirements of each application or feature available on device 100.

The memory 1350 can also store other software instructions (not shown), such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively. An activation record and International Mobile Equipment Identity (IMEI) 1374 or similar hardware identifier can also be stored in memory 1350.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the device can be implemented in hardware and/or in software, including in one or more signal processing and/or application specific integrated circuits.

What is claimed is:

1. A method comprising:
   presenting a document in a graphical user interface of a document editing application on a display of a first device to a first user;
   receiving, at the first device, information describing a first modification to the document at the first device by the first user;
   in response to receiving information describing the first modification to the document at the first device by the first user, the presentation of the document on the first device to reflect the first modification to the document at the first device by the first user without presenting an animation associated with the first modification made to the document at the first device by the first user;
   receiving, at the first device, information describing a second modification to the document at a second device by a second user;
   in response to receiving information describing the second modification to the document at the second device by the second user, changing the presentation of the document on the first device to reflect the second modification to the document at the second device by the second user and presenting an animation associated with the second modification to the document;
   receiving a message at the first device;
   identifying one or more keywords in text of the message, the one or more keywords associated with at least one of an attribute of the document and a feature or function of the document editing application; and
   presenting, on the first device, the message, wherein a portion of the text of the message associated with the identified one or more keywords is displayed as a selectable link, wherein the message is presented in a chat window displayed automatically when a new message is received or displayed in response to receiving input at an affordance.

2. The method of claim 1, wherein the second modification is associated with a graphical element of the document.

3. The method of claim 2, further comprising:
   animating the graphical element on the display of the first device.

4. The method of claim 3, further comprising
   determining a style of animation to present based on a type of the second modification; and
   presenting the animation having the determined style.

5. The method of claim 4, wherein the modification type is at least one of an addition, a move, a style change and a deletion.

6. The method of claim 4, wherein the animation style is at least one of a shake animation, an expansion animation, and a shrinking animation.

7. A non-transitory computer-readable medium including one or more sequences of instructions which, when executed by one or more processors, causes:
   presenting a document in a graphical user interface of a document editing application on a display of a first device to a first user;
   receiving, at the first device, information describing a first modification to the document at the first device by the first user;
   in response to receiving information describing the first modification to the document at the first device by the first user, changing the presentation of the document on the first device to reflect the first modification to the document at the first device by the first user without presenting an animation associated with the first modification made to the document at the first device by the first user;
   receiving, at the first device, information describing a second modification to the document at a second device by a second user;
   in response to receiving information describing the second modification to the document at the second device by the second user, changing the presentation of the document on the first device to reflect the second modification to the document at the second device by the second user and presenting an animation associated with the second modification to the document
   receiving a message at the first device;
   identifying one or more keywords in text of the message, the one or more keywords associated with at least one of an attribute of the document and a feature or function of the document editing application; and
   presenting, on the first device, the message, wherein a portion of the text of the message associated with the identified one or more keywords is displayed as a selectable link, wherein the message is presented in a chat window displayed automatically when a new message is received or displayed in response to receiving input at an affordance.

8. The non-transitory computer-readable medium of claim 7, wherein the second modification is associated with a graphical element of the document.

9. The non-transitory computer-readable medium of claim 8, further comprising:
   animating the graphical element on the display of the first device.

10. The non-transitory computer-readable medium of claim 9, further comprising
    determining a style of animation to present based on a type of the second modification; and
    presenting the animation having the determined style.

11. The non-transitory computer-readable medium of claim 10, wherein the modification type is at least one of an addition, a move, a style change, and a deletion.

12. The non-transitory computer-readable medium of claim 10, wherein the animation style is at least one of a shake animation, an expansion animation, and a shrinking animation.

13. The method of claim 1, further comprising:
    receiving a selection of the portion of the text of the message displayed as the selectable link; and
    in response to receiving the selection, performing an operation associated with the selectable link.

14. The method of claim 1, wherein the attribute of the document includes at least one of a page number, a paragraph, a chapter, and a section of the document.

15. The method of claim 1, wherein the attribute of the document includes a media item embedded in the document.

16. The method of claim 1, wherein the feature or function of the document editing application includes one or more of an operation and a menu item.

17. The method of claim 1, wherein the affordance includes a display of a number, the number associated with of a number of received chat messages.

18. The method of claim 1, wherein the portion of the text of the message includes the one or more keywords and additional words associated with the keywords.

19. The non-transitory computer-readable medium of claim 7, further comprising:
    receiving a selection of the portion of the text of the message displayed as the selectable link; and in response to receiving the selection, performing an operation associated with the selectable link.

20. The non-transitory computer-readable medium of claim 7, wherein the attribute of the document includes at least one of a page number, a paragraph, a chapter, and a section of the document.

21. The non-transitory computer-readable medium of claim 7, wherein the attribute of the document includes a media item embedded in the document.

22. The non-transitory computer-readable medium of claim 7, wherein the feature or function of the document editing application includes one or more of an operation and a menu item.

23. The non-transitory computer-readable medium of claim 7, wherein the affordance includes a display of a number, the number associated with of a number of received chat messages.

24. The non-transitory computer-readable medium of claim 7, wherein the portion of the text of the message includes the one or more keywords and additional words associated with the keywords.

25. A system comprising:
one or more processors; and
a non-transitory computer-readable medium including instructions which, when executed by the one or more processors, cause:
presenting a document in a graphical user interface of a document editing application on a display of a first device to a first user;
receiving, at the first device, information describing a first modification to the document at the first device by the first user;
in response to receiving information describing the first modification to the document at the first device by the first user, changing the presentation of the document on the first device to reflect the first modification to the document at the first device by the first user without presenting an animation associated with the first modification made to the document at the first device by the first user;
receiving, at the first device, information describing a second modification to the document at a second device by a second user;
in response to receiving information describing the second modification to the document at the second device by the second user, changing the presentation of the document on the first device to reflect the second modification to the document at the second device by the second user and presenting an animation associated with the second modification to the document;

receiving a message at the first device;
identifying one or more keywords in text of the message, the one or more keywords associated with at least one of an attribute of the document and a feature or function of the document editing application; and
presenting, on the first device, the message, wherein a portion of the text of the message associated with the identified one or more keywords is displayed as a selectable link, wherein the message is presented in a chat window displayed automatically when a new message is received or displayed in response to receiving input at an affordance.

26. The system of claim 25, wherein the second modification is associated with a graphical element of the document.

27. The system of claim 26, wherein the instructions further cause:
animating the graphical element on the display of the first device.

28. The system of claim 27, wherein the instructions further cause:
determining a style of animation to present based on a type of the second modification; and
presenting the animation having the determined style.

29. The system of claim 28, wherein the modification type is at least one of an addition, a move, a style change, and a deletion.

30. The system of claim 28, wherein the animation style is at least one of a shake animation, an expansion animation, and a shrinking animation.

31. The system of claim 25, wherein the instructions further cause:
receiving a selection of the portion of the text of the message displayed as the selectable link; and
in response to receiving the selection, performing an operation associated with the selectable link.

32. The system of claim 25, wherein the attribute of the document includes at least one of a page number, a paragraph, a chapter, and a section of the document.

33. The system of claim 25, wherein the attribute of the document includes a media item embedded in the document.

34. The system of claim 25, wherein the feature or function of the document editing application includes one or more of an operation and a menu item.

35. The system of claim 25, wherein the affordance includes a display of a number, the number associated with of a number of received chat messages.

36. The system of claim 25, wherein the portion of the text of the message includes the one or more keywords and additional words associated with the keywords.

* * * * *